United States Patent [19]
Carter

[11] Patent Number: 5,877,609
[45] Date of Patent: Mar. 2, 1999

[54] BATTERY WITH MULTI-CONNECTION TERMINALS AND INTEGRAL FUSE

[75] Inventor: Gary Keith Carter, Statham, Ga.

[73] Assignee: Esoteric Audio USA, Winder, Ga.

[21] Appl. No.: 12,752

[22] Filed: Jan. 23, 1998

[51] Int. Cl.[6] .................................................. H01M 10/46
[52] U.S. Cl. ........................................... 320/103; 320/104
[58] Field of Search ..................................... 320/103, 104, 320/105, 113, 165, 101; D13/104; 429/170; 439/507, 510

[56] References Cited

U.S. PATENT DOCUMENTS

| | | | |
|---|---|---|---|
| 5,111,130 | 5/1992 | Bates | 320/105 |
| 5,230,637 | 7/1993 | Weber | 320/105 X |
| 5,635,817 | 6/1997 | Shiska | 320/105 |
| 5,635,818 | 6/1997 | Quintero | 320/105 |
| 5,689,173 | 11/1997 | Oosaki et al. | 320/105 |

*Primary Examiner*—Edward H. Tso
*Attorney, Agent, or Firm*—Thomas, Kayden, Horstemeyer & Risley, L.L.P.

[57] ABSTRACT

A battery for supplying power to an automotive electrical system. In accordance with one aspect of the invention, the battery includes a first terminal and second terminal connected across at least one power cell configured to generate an electrical potential between the first and second terminals. The battery, however, further includes a first electrical distribution block being electrically connected directly with the first battery terminal, and thus is at the same electrical potential. Similarly, the battery includes a second electrical distribution block that is electrically isolated from the second terminal. In accordance with the preferred embodiment, the second distribution block is electrically connected to the second battery terminal via a protection fuse. Typically, the protection fuse will range from 60 amperes to 300 amperes in its rating value. In accordance with still another aspect of the present invention the first and second distribution blocks define multiple connection points where cables or other items of the electrical system may be electrically connected to the battery terminals. In accordance with one embodiment of the invention, these connection points may be defined by threaded bores within the distribution blocks and companion set screws. Cables or other items may then be secured, both physically and electrically, to the battery by advancing the set screw into the receiving bore.

19 Claims, 3 Drawing Sheets

BATTERY WITH MULTI-CONNECTION TERMINALS AND INTEGRAL FUSE

BACKGROUND OF INVENTION

1. Field of the Invention

The present invention generally relates to batteries for automotive electrical systems, and more particularly to a improved battery for automotive stereo systems.

2. Discussion of the Related Art

In recent years, there has been a significant proliferation in car audio systems. Many people are known to spend thousands of dollars to construct a high-power and high-performance car audio systems. Early in this recent movement, the emphasis was on power; bigger speakers, sub-woofers, more amplifiers were all demanded to enhance the systems. Now, to exact not only increased power but improved performance, car audio systems are becoming more sophisticated as well.

No longer are high-performance car audio systems those that have merely an amplifier, an equalizer and four speakers. Instead, standard fare in many car audio systems now includes substitute or auxiliary deep-cycle batteries, banks of power capacitors, high output alternators, gold-plated fused distribution blocks, twisted pair cabling with gold-plated connectors, heavy gauge copper cabling, battery isolators, high-current relays, and the list goes on. Indeed, to obtain the obsolute most from a system's sound quality, ancillary components like 12 volt DC fans and fan controllers are often used to maintain amplifiers at an optimum operating temperature. Sound dampening materials are also frequently used to minimize vehicular road noise. Indeed, it seems that virtually no detail is too small, when it comes to minimizing noise or maximizing sound quality. Not only is sound quality a significant issue, but system appearance is also important.

Having said this, it is well known that for most high-power, high-performance car audio systems, the conventional lead-acid battery is typically either replaced by, or supplemented with, a "deep-cycle" battery. Due to the power demands of many high-power audio systems, the battery is often drained, particularly if the stereo is played while the car is not running. Typical lead-acid batteries are designed for cold-cranking amps in order to start an automobile, and, unfortunately, can sustain only about 3 to 10 cycles before exhaustion (i.e., becoming completely dead). Dry cell batteries, however, have been developed for deep cycle applications, whereby the battery may cycle as many as several hundred times before exhaustion. Preferably, an auxiliary battery of this type is used to supply power to the stereo system, leaving the ignition battery undisturbed. As is known, this auxiliary battery is often placed in the trunk of the vehicle and is wired to the automobile's alternator, so that the auxiliary battery becomes recharged when the vehicle engine is running.

Although most components in a high-performance automotive audio system runs on a separately fused circuits, a main power fuse is also placed in series with the supply battery (e.g., the auxiliary battery). In order to reduce fire and shock hazards, this main fuse is typically fused within 12 to 18 inches of the battery. As is known, typical values for this main fuse range from 60 to 300 amperes, depending upon the power requirements of the particular system design. Accordingly, the fuse is often rather large in physical size.

Indeed, in-line fuse holders are frequently 6 inches in length.

One shortcoming of the prior art systems described above relates to the installation of this main fuse. Often, the fuse is left to "dangle" in mid-air. Since the fuse must be so closely attached to the battery (i.e., 12–18 inches), there is usually not enough cable length to allow the fuse to be mounted in a convenient location. Unless there is a railing or some other appropriate platform near the battery on which to mount the fuse, the fuse is simply supported (i.e., "dangled") by the power cable run from the battery, which is an unsightly configuration.

Another shortcoming of these prior art systems relates to the excessive number connection points required. Namely, an electrical connection is formed between the battery and the first power cable. Another is formed between the first power cable and the fuse. Still another is formed between the opposite fuse contact and another power cable that extents to the next component in the audio system (perhaps a storage capacitor). Each additional connection point increases system installation time, and also increases the system's susceptibility to electrical noise.

Accordingly, what is desired is an improved battery for supplying power to automotive electrical systems, and specifically for automotive stereo systems.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a battery for supplying power to an automotive electrical system. In accordance with one aspect of the invention, the battery includes a first terminal and second terminal connected across at least one power cell configured (like in conventional automotive batteries) to generate an electrical potential between the first and second terminals. The battery, however, further includes a first electrical distribution block being electrically connected directly with the first battery terminal, and thus is at the same electrical potential. Similarly, the battery includes a second electrical distribution block that is electrically isolated from the second terminal.

In accordance with the preferred embodiment of the invention, the second distribution block is electrically connected to the second battery terminal via a protection fuse. Typically, the protection fuse will range from 60 amperes to 300 amperes in its rating value. In accordance with this aspect of the invention, the battery may or may not be supplied with the protection fuse. Instead, the battery may simply be configured for ready attachment of the protection fuse, which will often be separately supplied.

In accordance with another aspect of the present invention, the first and second distribution blocks define multiple connection points where cables or other items of the electrical system may be electrically connected to the battery terminals. In accordance with one embodiment of the invention, these connection points may be defined by threaded bores within the distribution blocks and companion set screws. Cables or other items may then be secured, both physically and electrically, to the battery by advancing the set screw into the receiving bore.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
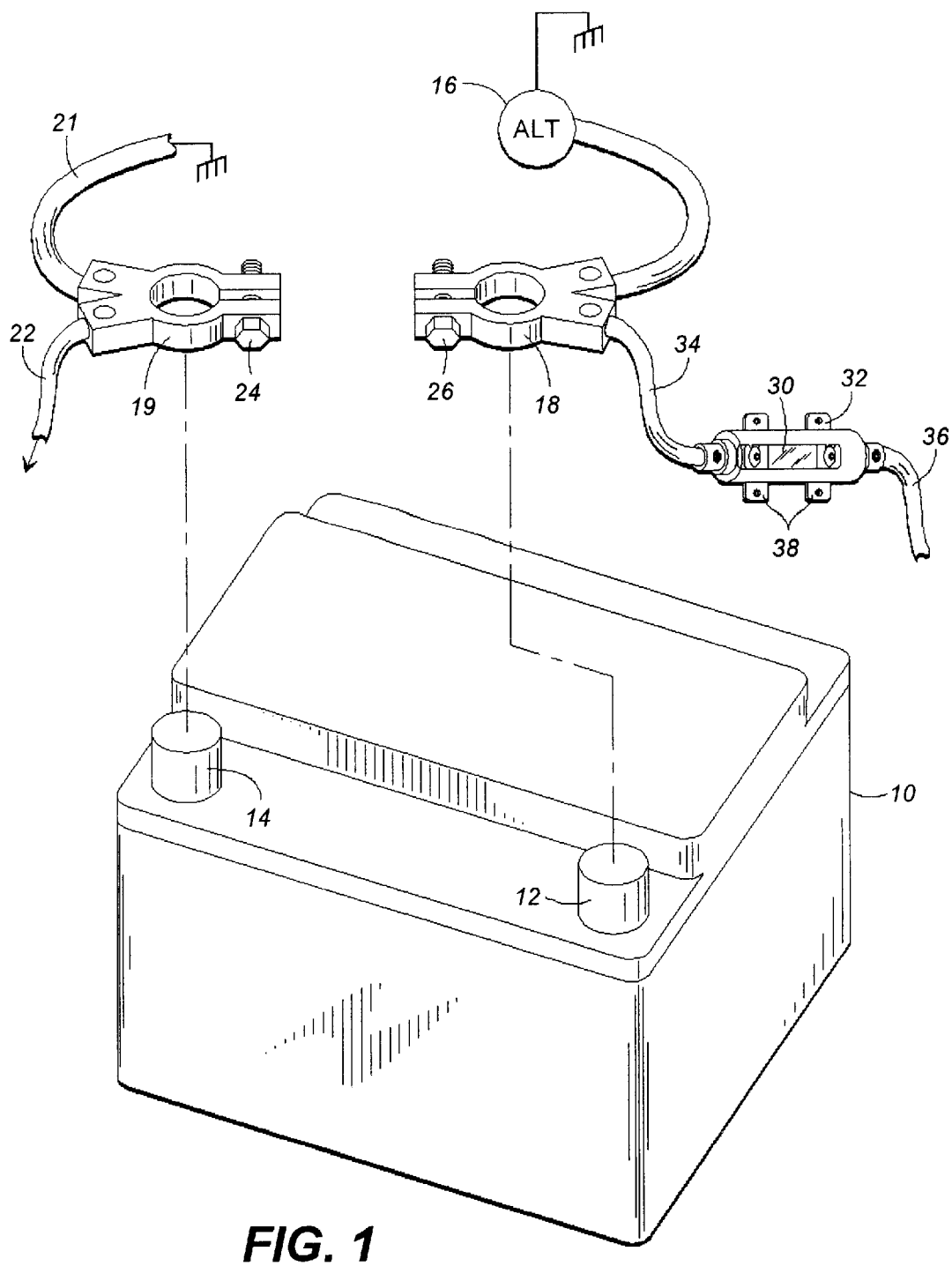
FIG. 1 is an exploded perspective view illustrating an automotive battery and its immediate connections, as is known in the prior art.

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

Turning now to the drawings, reference is made to FIG. 1, which is an exploded, perspective view that illustrates a portion of an automotive electrical system, as is known in the prior art. Specifically, a battery 10 is shown having terminals 12 and 14, which supply electrical power to the electrical system of the automobile. In this regard, the battery 10 may be a lead-acid battery as is typically used in starting an automobile, and powering its electrical system when the engine is not running. Preferably, however, the battery 10 is a deep-cycle battery of a type that is now well known and commonly used to power automotive audio systems. Accordingly, the battery 10 may be an auxiliary battery that is positioned, for example, in the trunk of an automobile as a secondary power source, specifically designated for powering an automotive audio system.

As is known, whether the battery 10 is a primary or auxiliary battery, the automobile's alternator 16 is used to recharge the battery 10 while the vehicle is running. It will be appreciated that the diagram of FIG. 1 is presented for purposes of illustration, and those skilled in the art will appreciate the physical and electrical connections that are made for implementing a high-performance automotive audio system.

Also illustrated in FIG. 1 are terminal connectors 18 and 19 having an integral distribution block that allows for multiple electrical cable connections (e.g., cables 21 and 22). In this regard, battery terminals 12 and 14 are typically cylindrical studs that either project upwardly from the top of the battery (in the case of a top mount battery) or outwardly from the side (not shown), as in the case of a side mount battery. Accordingly, connectors 18 and 19 typically define a central cylindrical bore that is dimensioned to conformingly engage the outer diameter of the battery terminals 12 and 14 Set screws 24 and 26 may be provided to constrict the diameter of the receiving bore to therefore secure the terminal connectors 18 and 19 to the battery terminals 12 and 14. This ensures a secure physical and sound electrical connection therebetween.

As previously mentioned, a main protection fuse 30 is provided for system protection, and is disposed typically within 12 to 18 inches of the battery 10. Usually, this main fuse 30 is disposed within a in-line fuse holder 32. As will be appreciated, the fuse holder 32 may be provided in a variety of configurations, depending upon the size and rating of the fuse 30. Common values of the fuse 30 range from 60 amperes to 300 amperes. As a result, the electrical cable (e.g., 34 and 36) connected in series with the fuse 30 is relatively rigid, heavy gage wire. Mounting feet 38 may be integrally provided with the fuse holder 32 to allow the fuse holder 32 to be secured (using screws) to a side wall or other platform in the proximity of the battery 10. However, as is often the case, there may be no convenient and readily accessible location for mounting the fuse holder 32. As a result, the main fuse 30 and fuse holder 32 often "dangle" in free space, supported only by the relatively rigid cabling 34 and 36.

Figure 2:
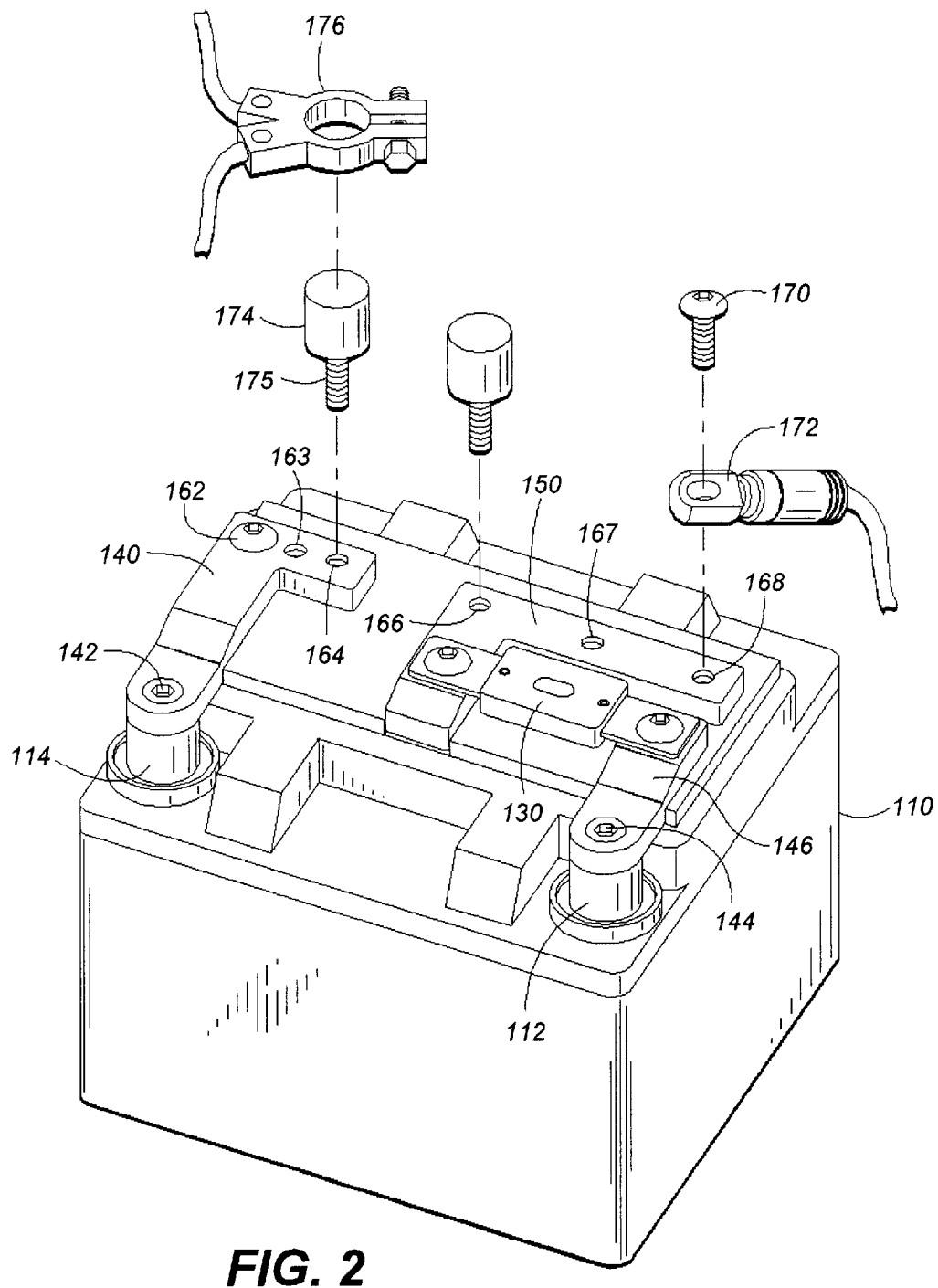
FIG. 2 is an exploded perspective view similar to that of FIG. 1, illustrating a battery constructed in accordance with the present invention.

Reference is now made to FIG. 2, which illustrates the preferred embodiment of the present invention. Specifically a battery 110 is provided for powering an automotive audio system. For purpose of the inventive concepts, the battery 110 may be either a leadacid type battery, or a deep cycle marine-type or dry-cell battery. Preferably, the battery 110 is of the latter type, as the ability to cycle many times is a desired quality in a battery directed for high power and high performance audio systems. In accordance with one aspect of the present invention, the main fuse 130 is integrally disposed with the battery 110, thereby eliminating the installation and configuration (i.e., dangling, unsecured connection) shortcomings of prior art systems. Like the battery 10 of FIG. 1, the preferred battery 110 has a pair of terminals 112 and 114 that are connected across at least one cell within the battery 110 to provide an electrical potential of typically 12 to 14 volts therebetween (although 6 volt and other voltage batteries may be provided, consistent with the invention). For purposes of convention and illustration, assume that the first terminal 114 is negative with respect to the second terminal 112.

Although not shown, a threaded, receiving bore may be axially disposed in the top of terminals 112 and 114 to receive a threaded fastening screw. In the case of the first terminal 114, the fastening screw 142 secures a first distribution block 140 thereto.

Accordingly, the first distribution block 140 is directly connected (electrically) with the first terminal 114, and therefore is at a common electrical potential therewith. In the case of the second terminal 112, the fastening screw 144 secures a short conductive bridge 146 or connection span to the terminal 112. As will be appreciated, this bridge 144 is not necessary for purposes of the invention, but merely for implementation of the preferred embodiment. A second distribution block 150 is integrally attached (as by screws or otherwise) to the battery 110. The main fuse 130 is then electrically connected between the bridge 144 (and thus the second terminal 112) in the second distribution block 150. Except for this connection via the main fuse 130, the second distribution block 150 is electrically isolated from the second terminal 112.

Accordingly, what is provided is an improved battery for supplying an automotive audio system having a main fuse 130 integrally attached to the battery 110. In this way, the number of electrical connections associated with the main fuse 130 are minimized In addition, a low profile and highly compact configuration is achieved. It will be appreciated, however, that for purposes of the present invention, the fuse 130 may be separately provided. That is, in accordance with one aspect of the present invention an improved battery configuration is provided whereby a first battery terminal 114 is electrically connected (directly) with a first distribution block 140, and a second battery terminal 112 is electrically isolated from a second distribution block 150. However, the second terminal 112 is readily adapted and disposed for electrical connection with the second distribution block 150 through a main fuse 130. As a result, the fuse 130 may be provided by a manufacturer or a supplier separate and apart from the battery itself. In accordance with the another aspect of the present invention, the distribution blocks 140 and 150 are configured for multiple connection points. In the preferred embodiment illustrated in FIG. 2, four such connection points 162, 164, 166, and 168 are shown (two connection points on each distribution block). Of course, more or few connection points may be provided. In addition, two "direct-wire" connection points are illustrated. These "direct-wire" connection point comprise set screws 163 and 167 that are vertically disposed to project into horizontally disposed bores (not shown). Specifically, smooth bores are provided to receive (directly) a conductive cable (as opposed to a ring-type connector 172). The set screws 163 and 167 may then be advanced to secure the connection, in a manner that will be appreciated by those skilled in the art. The foregoing connection types have been discussed merely for purposes of illustration, and it will be understood that other types of connection points may be provided consistent with the concepts and spirit of the present invention.

In accordance with the preferred embodiment, a connection point comprises a set screw (e.g., 170) that secures an electrical contact with the distribution block. For example, set screw 170 is illustrated as securing a connector 172 having a circular bore for receiving this set screw to the distribution block 150. A screw driver may be used to advance the screw 170 into a threaded bore provided in the distribution block 150, to secure and establish electrical connection with the connector 172. In this regard, it will be appreciated that the battery 10 of the preferred embodiment is readily adapted to retrofit into existing automotive systems. Specifically, threaded studs 174 may be provided having a threaded end 175 that is sized and configured to fit within the threaded receiving bore of the distribution block (e.g., 140). The upper end, however, of the stud 174 is dimensioned similar to the studs (e.g., 12 and 14 of FIG. 1) of conventional automotive battery terminals. Therefore, the terminal connectors (e.g., 176) of existing automotive systems may be readily removed from the terminals of a conventional battery and attached to the studs 174 of the battery 110 constructed in accordance with the preferred embodiment. This retrofit-ability may be particularly desired in, for example, the case of a leased vehicle. In situations where a person does not own a vehicle, that person may not desire to install custom wiring or rewiring of the automobile's electrical system. Instead, the person may use the battery 110 of the preferred embodiment, secure existing battery connections thereto via the retrofit studs 174. and add any additional wiring or connections at the additional connection sites on the distribution blocks 140 and 150.

Figure 3:
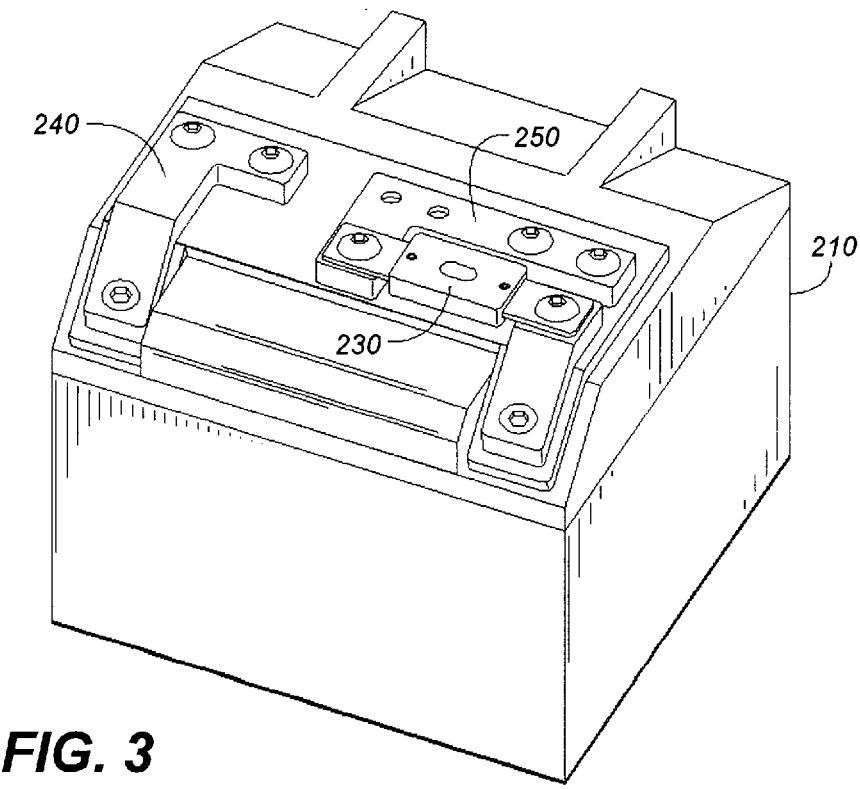
FIG. 3 is a perspective view of a battery constructed in accordance with an alternative embodiment of the present invention.
Figure 4:
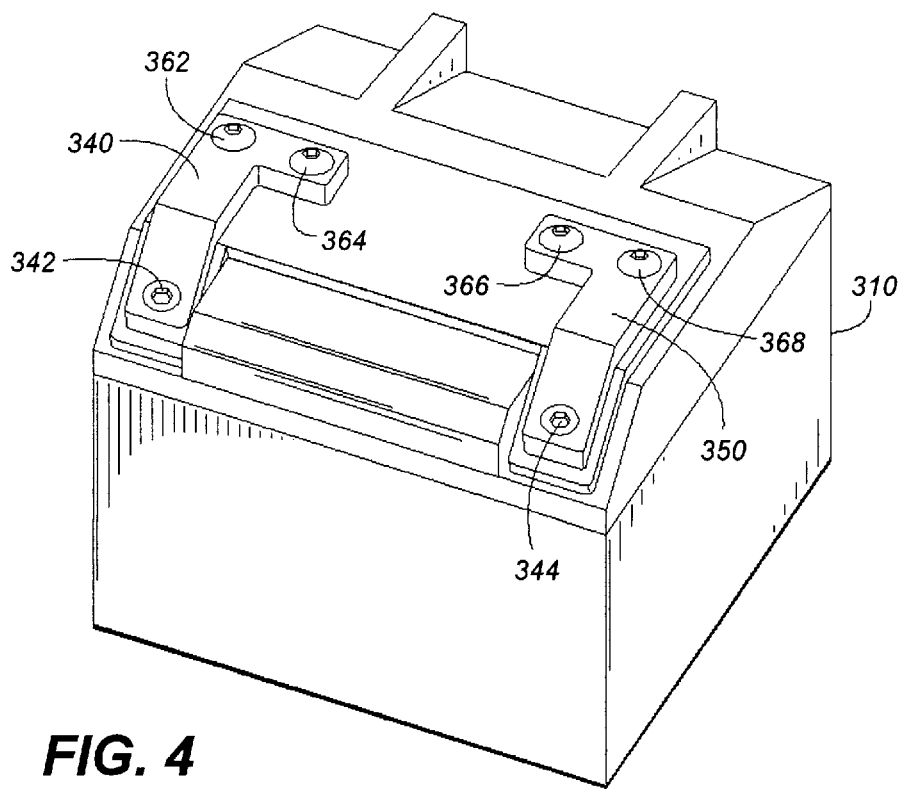
FIG. 4 is a perspective view of a battery constructed in accordance with an alternative embodiment of the present invention.

In view of the foregoing discussion, it will be appreciated that the inventive aspects described above may be provided in a variety of configurations. For example, referring briefly to FIG. 3, a battery 210 may be provided with an angular top configuration such as that shown. In this embodiment, other aspects of the distribution blocks 240 and 250 and integrally attached main fuse 230 are similar to that described in connection with FIG. 2. It may be, however, for purposes of compartment size or configuration that the angled battery top of FIG. 3, as opposed to the flattened battery top of FIG. 2, is preferred.

In accordance with yet another aspect of the present invention, the main fuse may be separately provided and attached in accordance with prior art configurations, but an improved battery 310 having multiple connection distribution blocks 340 and 350 is provided. In this embodiment, distribution blocks 340 and 350 may be threadedly attached to the terminal studs of the battery 310, as by set screws 342 and 344. In this regard, one battery configuration may be provided with distribution blocks 340 and 350 (as shown) wherein each distribution block has two connection points 362, 364, 366, and 368. Alternatively, such distribution blocks 340 and 350 may be replaced by distribution blocks having more or fewer connection points.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An improved battery for supplying power to an automotive stereo system comprising:

a first terminal and second terminal connected across at least one power cell configured to generate an electrical potential between the first and second terminals;

a first electrical distribution block having a plurality of connection points for connection to the automotive stereo system, the first electrical distribution block being electrically connected directly with the first terminal;

a second electrical distribution block having a plurality of connection points for connection to the automotive stereo system, the second electrical distribution block being electrically isolated from the second terminal; and a protection fuse electrically connected between the second electrical distribution block and the second terminal.

2. The battery as defined in claim 1, wherein the protection fuse is rated between approximately 60 amperes and 300 amperes.

3. The battery as defined in claim 1, wherein at least one of the plurality of connection points is defined by a threaded bore and a companion set screw.

4. The battery as defined in claim 1, wherein at least one of the plurality of connection points is defined by a threaded bore and a companion stud having a threaded shaft for mating with the threaded bore and a body portion that is dimensioned substantially the same as a conventional automotive battery terminal.

5. The battery as defined in claim 1, wherein at least one of the plurality of connection points is direct-wire type connection point.

6. The battery as defined in claim 5, wherein the direct-wire type connection point is defined by a smooth bore for receiving a conductive cable and a set screw that is disposed to project into the smooth bore.

7. The battery as defined in claim 1, wherein the first and second distribution blocks are removably attached to the battery, whereby the first and second distribution blocks may be readily interchanged with third and fourth distribution blocks having a different configuration.

8. A battery for supplying power to an automotive electrical system comprising:

a first terminal and second terminal connected across at least one power cell configured to generate an electrical potential between the first and second terminals;

a first electrical distribution block being electrically connected directly with the first terminal; and a second electrical distribution block being electrically isolated from the second terminal.

9. The battery as defined in claim 8, further including a protection fuse electrically connected between the second conductive terminal and the second electrical distribution block.

10. The battery as defined in claim 9, wherein the protection fuse is rated between approximately 60 amperes and 300 amperes.

11. The battery as defined in claim 8, wherein the first and second distribution blocks each define a single connection point for establishing an electrical connection with components of an electrical system.

12. The battery as defined in claim 8, wherein the first and second distribution blocks each define at least one connection point for establishing an electrical connection with components of an electrical system.

13. The battery as defined in claim 8, wherein the first and second distribution blocks each define a plurality of connection points for establishing an electrical connection with components of an electrical system.

14. The battery as defined in claim 13, wherein at least one of the plurality of connection points is direct-wire type connection point.

15. The battery as defined in claim 12, wherein the at least one connection point is defined by a threaded bore and a companion set screw.

16. The battery as defined in claim 12, wherein at least one connection point is defined by a threaded bore and a companion stud having a threaded shaft for mating with the threaded bore and a body portion that is dimensioned substantially the same as a conventional automotive battery terminal.

17. The battery as defined in claim 8, wherein the first and second distribution blocks are removably attached to the battery, whereby the first and second distribution blocks may be readily interchanged with third and fourth distribution blocks having a different configuration.

18. The battery as defined in claim 8, wherein the battery is a deep-cycle battery.

19. The battery as defined in claim 8, wherein the battery is a lead-acid battery.

* * * * *